Sept. 14, 1948.  D. R. ELLIOTT ET AL  2,449,461

TIRE CURING BAG

Filed March 20, 1946

INVENTOR
DANIEL R. ELLIOTT
BY KNOWLES K. MADISON

Charles C. Willson
ATTORNEY

Patented Sept. 14, 1948

2,449,461

UNITED STATES PATENT OFFICE 2,449,461

TIRE CURING BAG

Daniel R. Elliott and Knowles K. Madison, Detroit, Mich., assignors to United States Rubber Company, New York, N. Y., a corporation of New Jersey Application March 20, 1946, Serial No. 655,902

3 Claims. (Cl. 18—45)

This invention relates to curing bags, and in particular it relates to curing bags as used for the inflatable medium in the process of manufacturing pneumatic tires.

In the manufacture of pneumatic tires it is common practice to employ a curing bag within the uncured tire casing and introduce fluid under pressure and at elevated temperatures within the curing bag for the purpose of expanding a tire carcass within a mold for vulcanizing the tire. In order to shape the tire casing properly it is necessary that the wall of the curing bag be relatively thick and formed of a rubber or synthetic rubber composition. In the vulcanization of pneumatic tires, in addition to heat being applied to the outside of the tire mold, heat is also applied to the tire carcass by means of heat transmission from the interior of the curing bag. Steam or hot water is usually the fluid used as a heating medium.

Rubber or synthetic rubber compositions are usually poor conductors of heat. Therefore due to the substantial thickness of the wall of the curing bag a considerable time interval is required before the high temperature within the curing bag is transmitted to the outside of the curing bag and to the tire carcass. We have found that by using a high thermal conducting carbon black as a compounding ingredient of the rubber composition that the time required for curing tires may be reduced from 10% to 20% as compared with curing bags which include in their composition ordinary commercial carbon black. The material particularly useful for this purpose is acetylene carbon black. When using acetylene carbon black, the method of processing the curing bag is substantially the same as when ordinary types of carbon black are employed.

Among the advantages of our invention are to provide a curing bag having a higher thermal conductivity than conventional type curing bags; to provide a curing bag which will permit a reduction in the time required for curing pneumatic tires; to provide such a curing bag while maintaining the same dimensions as for conventional curing bags; and to provide such a curing bag which requires no additional processing or construction operations in its manufacture.

In accordance with the practice of our invention we contemplate the use of acetylene carbon black as a reinforcing agent in the compounding and manufacture of curing bags. Curing bags for such purposes are usually formed of natural rubber, such for example as *Hevea brasiliensis*, or synthetic rubber. By synthetic rubber we refer to those principal compositions generally referred to as Buna S or GR-S (copolymers of butadiene-1,3 and styrene) and as Buna N or GR-N (copolymers of butadiene-1,3 and acrylonitrile. It is to be understood therefore that reference to rubber as used herein is intended to include natural rubber as well as synthetic rubber. Curing bags for pneumatic tires require a relatively thick wall in order to shape the tire properly. For example, a 6.00-16 tire requires a curing bag having a wall thickness which varies throughout its cross section of from $\frac{1}{16}''$ to $\frac{3}{4}''$. The thickest portion of the curing bag lies in the region of the tire beads. It is therefore difficult because of the thermal insulating characteristics of curing bags to provide a sufficient amount of heat to the bead portions of tires. As a result, it sometimes occurs that the bead portions of pneumatic tires are not properly vulcanized. The shape and appearance of a conventional type of curing bag is illustrated in the accompanying drawing, wherein:

The curing bag 10 is shown as having the usual inlet pipe 11 through which hot water or steam may be forced into the bag to heat the bag, and expand it sufficiently to force the tread of the tire that is being vulcanized into intimate contact with the contour of the tire mold.

Figure 1:
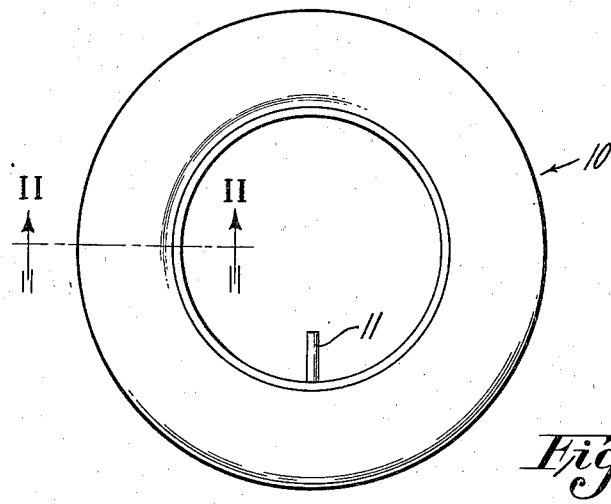
Fig. 1 is a side view of a tire curing bag.
Figure 2:
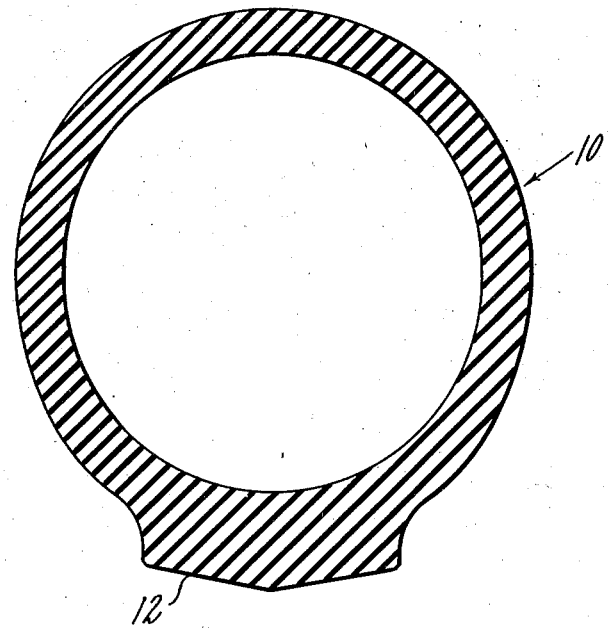
Fig. 2 is an enlarged section taken on the line II—II of Fig. 1.

The pronounced thickness of the walls of the curing bag is shown in Fig. 2 as is also the portion 12 thereof of increased thickness that lies between the bead wires of the tire.

By giving the curing bag 10 the shape and appearance of curing bags employed heretofore, but departing from the prior practice by utilizing acetylene carbon black as a compounding ingredient in the rubber composition of the curing bag it is possible to decrease the vulcanizing time and to insure greater uniformity of vulcanization of the tire casing. Examples of compositions suitable for forming curing bags with a base of natural rubber, Buna S and Buna N are tabulated as follows, the parts being by weight:

*Example A*

|  | 1 | 2 |
|---|---|---|
| Natural Rubber | 100 | 100 |
| Acetylene carbon black |  | 55 |
| Clay | 80 |  |
| Carbon black (Channel black) | 20 | 20 |
| Zinc oxide | 3 | 3 |
| Softener | 8 | 8 |
| Accelerator | 1 | 1 |
| Sulfur | 4 | 4 |
| Thermal Conductivity | 1.28 | 1.70 |

Example B

|  | 1 | 2 |
|---|---|---|
| Buna S (GR-S) | 100 | 100 |
| Carbon black [1] | 35 | |
| Acetylene carbon black | | 35 |
| Softener | 10 | 10 |
| Zinc oxide | 5 | 5 |
| Accelerator | 1.5 | 1.5 |
| Sulfur | 2.5 | 2.5 |
| Thermal Conductivity | 1.57 | 1.85 |

Example C

|  | 1 | 2 | 3 | 4 |
|---|---|---|---|---|
| Buna N (GR-N) | 100 | 100 | 100 | 100 |
| Carbon black [1] | 50 | | | 15 |
| Acetylene carbon black | | 50 | 60 | 40 |
| Softener | 9 | 9 | 9 | 9 |
| Zinc oxide | 30 | 30 | 30 | 30 |
| Accelerator | 2.5 | 2.5 | 2.5 | 2.5 |
| Sulfur | 2 | 2 | 2 | 2 |
| Thermal Conductivity | 1.23 | 1.80 | 1.97 | 1.70 |

[1] Conventional carbon black containing no acetylene carbon black.

By forming curing bags of such a composition it is possible to increase the thermal conductivity of the composition about 46%. Also, by this increase in conductivity it is possible to reduce the time required to cure pneumatic tires 10% to 20% as compared with conventional curing bags of the same general dimensions. While the rubber or synthetic rubber composition will exhibit good performance when the acetylene carbon black content is approximately 50% of the rubber by weight, as indicated in the above tables, it is to be understood that substantially satisfactory results may also be obtained by varying the content of the acetylene carbon black from about 30% to 75% by weight of the natural or synthetic rubber.

The thermal conductivity ratings referred to in the above tables indicate B. t. u. per square foot, per hour for a temperature gradient of 1° F. per inch. Further, these ratings have been computed from instrumentation measurements based on actual tests.

A number of tests have been made in order to show the relative thermal conductivity of the acetylene carbon black composition as compared with the composition which includes ordinary commercial carbon black free of acetylene carbon black. These tests listed in the following table indicate that the average thermal conductivity of the acetylene black composition is in the order of 146.5%.

Relative thermal conductivity

| Sample No. | Conventional Carbon Black | Acetylene Carbon Black |
|---|---|---|
|  | Percent | Percent |
| 1 | 100 | 145 |
| 2 | 100 | 153 |
| 3 | 100 | 152 |
| 4 | 100 | 145 |
| 5 | 100 | 134 |
| 6 | 100 | 150 |
| Average | 100 | 146.5 |

In actual tests for the determination of the time curing cycle for vulcanizing pneumatic tires it has been found that on tires which ordinarily require a curing cycle of 51 minutes it is possible, by using curing bags constructed in accordance with the practice of our invention, to reduce the curing cycle to 45 minutes. This represents a substantial reduction in vulcanization time with a corresponding saving in manufacturing costs and makes possible an increase in production. These tests indicating a reduction in the curing cycle are based on an external temperature for the tire casing of 298° F. and a circulating water temperature within the curing bag of 340° F.

As thus described it is believed apparent that we have provided a novel composition for curing bags which makes possible increased production and reduction in the time required for the vulcanizing cycle, and while we have described a preferred embodiment of the invention it is to be understood that it is susceptible of those modifications which appear obviously within the spirit of the invention and the scope of the appended claims.

Having thus described our invention what we claim and desire to protect by Letters Patent is:

1. A curing bag capable of giving good service in vulcanizing pneumatic tire casings, said bag being formed of a composition comprising a rubber stock having incorporated throughout the stock from 30 to 75 parts by weight, based on the weight of the rubber stock, of acetylene carbon black to increase the thermal conductivity of the bag so that heat will be conducted quickly through its walls to the tire casing.

2. A curing bag capable of giving good service in vulcanizing pneumatic tire casings, said bag being formed of a composition comprising a rubber stock having incorporated throughout the stock a sufficient amount of acetylene carbon black to impart to the composition, a thermal conductivity of the order of at least 1.37 B. t. u. per square foot, per hour for a temperature gradient of 1° F. per inch so that heat will be conducted quickly through the walls of the bag to the tire casing.

3. A curing bag capable of giving good service in curing enclosing rubber articles, said bag being formed of a composition comprising a rubber stock having incorporated throughout the stock at least 30 parts by weight, based on the weight of the rubber stock, of acetylene carbon black to increase the thermal conductivity of the bag so that heat will be conducted quickly through its walls to the enclosing article being cured.

DANIEL R. ELLIOTT.
KNOWLES K. MADISON.

REFERENCES CITED

The following references are of record in the file of this patent:

UNITED STATES PATENTS

| Number | Name | Date |
|---|---|---|
| 1,801,335 | Denmire | Apr. 21, 1931 |
| 2,305,412 | Frolich et al. | Dec. 15, 1942 |
| 2,329,332 | Bull et al. | Sept. 14, 1943 |
| 2,342,576 | Fielding | Feb. 22, 1944 |

OTHER REFERENCES

Rubber Chemistry & Technology, vol. 15, 1942, pgs. 146–148.

Gotlobb's Technology of Rubber, 1927, pp. 166 and 167. (Copy in U. S. Patent Office Scientific Library.)